Figure 1:
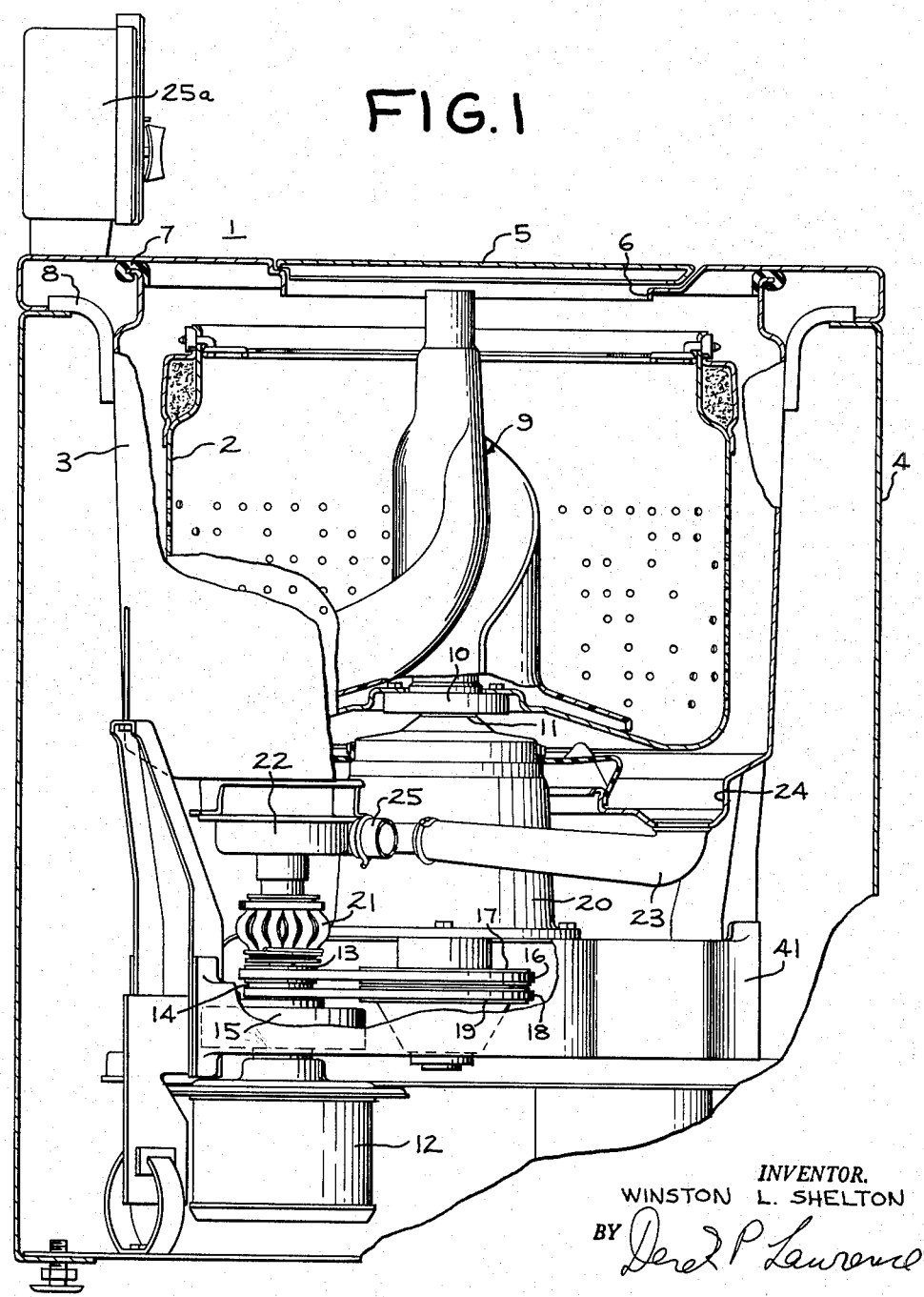

INVENTOR.
WINSTON L. SHELTON
BY
HIS ATTORNEY

April 13, 1965   W. L. SHELTON   3,177,739
BELT DRIVEN MEANS FOR SELECTIVELY PROVIDING TWO
SPEEDS FROM A SINGLE SOURCE
Filed March 19, 1964   2 Sheets-Sheet 2
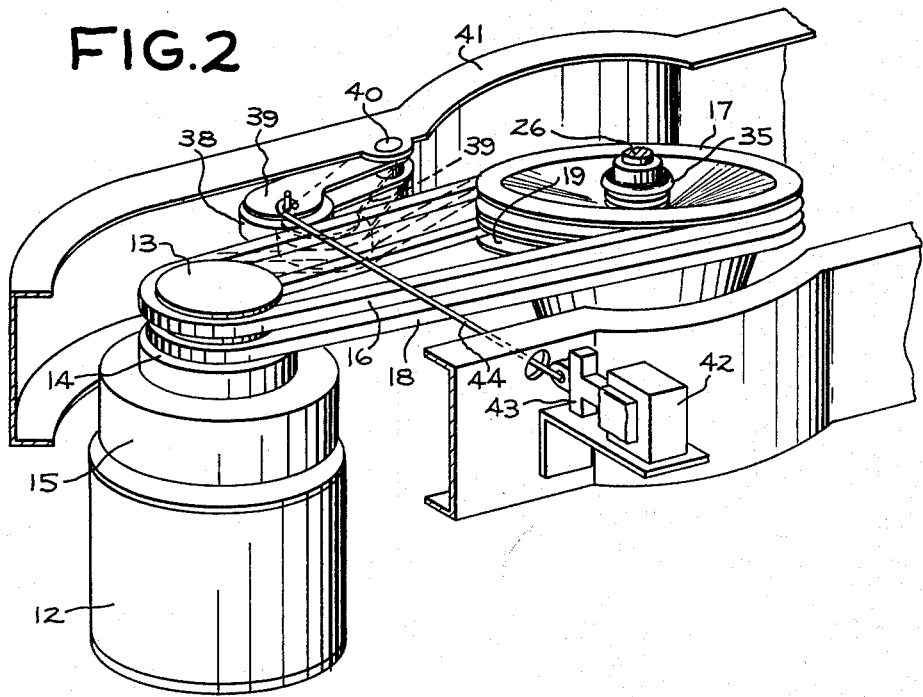
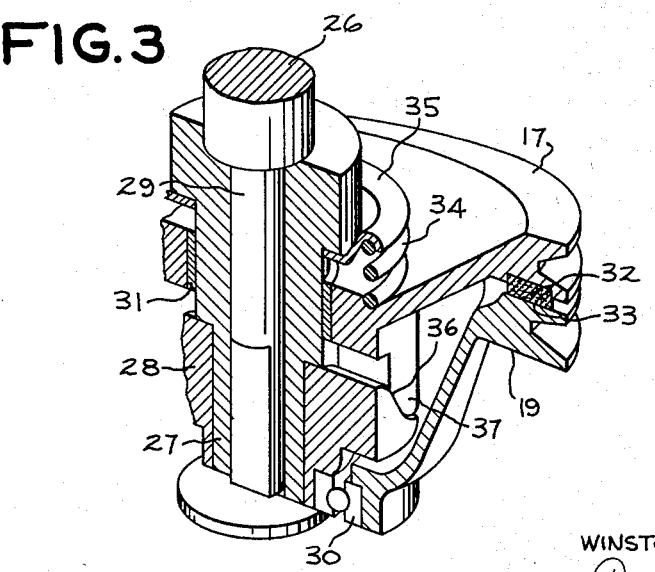
INVENTOR.
WINSTON L. SHELTON
BY *Derel P Lawrence*
HIS ATTORNEY

United States Patent Office 3,177,739
Patented Apr. 13, 1965

3,177,739
BELT DRIVEN MEANS FOR SELECTIVELY PROVIDING TWO SPEEDS FROM A SINGLE SOURCE
Winston L. Shelton, Jeffersontown, Ky., assignor to General Electric Company, a corporation of New York
Filed Mar. 19, 1964, Ser. No. 353,194
5 Claims. (Cl. 74—722)

This invention relates to speed changing means, and more particularly to means for providing two different output speeds from a single speed source in a belt-driven system.

It is an object of my invention to provide an improved two-speed belt system wherein selection of either of two speeds from a single-speed source may be economically effected.

It is a further, more specific, object of my invention to achieve this goal through the use of a system wherein two axially aligned pulleys cooperate with each other to provide the one speed, and one of the pulleys alone effects the driving operation at the second speed.

In one aspect thereof, my invention provides for first and second driving pulleys, both to be driven from a single-speed driving source. These pulleys drive, respectively, first and second driven pulleys through closed belts in the usual way. Both driven pulleys are rotatably mounted on a driven member, and the second driven pulley is also axially movable thereon. The driven pulleys have drive surfaces which may abut each other whereby one pulley may drive the other.

The belt connecting the second drive pulley to the second driven pulley is long enough so as to slip. Take-up means are provided so that, selectively, this belt may either slip, or be tightened on the pulleys so as to drive the second driven pulley.

The second driven pulley and the driven member have a cam surface and follower arrangement, with one secured to the driven means and the other secured to the pulley so that the driven means is driven through the cam follower and surface by the second driven pulley during rotation thereof. Suitable biasing means provide for biasing the second driven pulley toward the first driven pulley so that they are in driving engagement with each other, and also for biasing the cam surface and cam follower together.

When the take-up means permits slipping of the belt connecting the second drive and driven pulleys, the first driven pulley determines the speed of operation by its driving engagement with the second driven pulley. However, when the belt is tightened, it is the second driven pulley that effects the driving operation at a different speed; there is no interference with this by the first driven pulley because the second driven pulley, when it is so operated, is moved axially out of engagement with the first driven pulley by the cam follower and cam surface.

The subject matter which I regard as my invention is particularly pointed out and distinctly claimed in the concluding portion of this specification. My invention, however, both as to organization and method of operation together with further objects and advantages thereof, may best be understood by reference to the following description taken in conjunction with the accompanying drawings.

In the drawings, FIGURE 1 is a side elevational view of a clothes washing machine which is shown as being typical of machines in which my improved two-speed arrangement may be provided, the view being partially broken away and partially in section;

FIGURE 2 is a view in perspective of the two speed driving arrangement of my invention as incorporated in the machine of FIGURE 1; and FIGURE 3 is an enlarged fragmentary view in perspective and partly in cross section, showing additional details of my invention.

Referring now to FIGURE 1, there is shown an agitator-type washing machine 1 having a conventional perforated basket or clothes receiving receptacle 2 provided within an imperforate outer tub 3 which serves as a liquid receptacle, the basket and tub together serving as container means for clothes and the liquid in which they are to be washed and rinsed. Tub 3 is rigidly mounted within an appearance cabinet 4 which includes a cover 5 which may be opened to provide access through an opening 6 to basket 2. A suitable gasket 7 may be provided so as to form a seal between the top of tub 3 and the top of cabinet 4. The rigid mounting of tub 3 within cabinet 4 may be effected by any suitable means such as, for instance, heavy metal strips 8 each connected at one end to the cabinet and at the other end to the tub.

At the center of basket 2, there is positioned a vertical axis agitator 9 of a shape appropriate to effect a washing action when oscillated. Both the basket 2 and the agitator 9 are rotatably mounted. The basket is mounted on a flange 10 of a rotatable hub 11. The agitator 9 is mounted on a shaft (not shown) which extends upwardly through hub 11 and is secured to the agitator so as to drive it.

During a typical cycle of operation of machine 1, water is introduced into tub 3 and basket 2, and agitator 9 is then oscillated back and forth to cause washing of the clothes. After a predetermined period of this, the basket 2 is rotated at high speed to extract centrifugally the washing liquid from the clothes and discharge it to drain. Following this extraction operation, clean water is introduced to the basket for rinsing the clothes and the agitator is again oscillated. Finally, the basket is once more rotated at high speed to extract the rinse water.

Basket 2 and agitator 9 are driven through a suitable drive system which in the present case is contemplated to include a reversing motor 12 connected to drive a pair of drive pulleys 13 and 14 through a suitable clutch 15. A belt 16 connects drive pulley 13 to a driven pulley 17, and a belt 18 connects drive pulley 14 to a second driven pulley 19, as will be further explained herebelow. The driving of the driven pulleys 17 and 19 provides for the input of power to a transmission assembly 20. When motor 12 is rotated in one direction, transmission 20 causes agitator 9 to oscillate. Conversely, when motor 12 is driven in the opposite direction, transmission 20 causes rotation of basket 2 and agitator 9 together at high speed for centrifugal liquid extraction. It will be recognized that there are many well-known transmission mechanisms for effecting the types of motion described hereabove.

In addition to operating transmission 20 as described, motor 12 also provides a direct drive through a flexible coupling 21 to a pump structure 22. Pump 22 has an inlet connected by a conduit 23 to an opening 24 in the lowermost portion of tub 3, and an outlet connected by a conduit 25 to a suitable drain (not shown). Pump 22 is operative, during rotation of motor 12 in the direction to provide spin, to draw liquid out of the tub through conduit 23 and discharge it to drain. In the other direction of rotation of motor 12, pump 22 is substantially inoperative.

It will be understood that the components described, together with other components normally included in a washing machine such as a suitable water supply system and suitable controls (usually located within control panel 25a) provide a complete and operative washing machine. In such washing machines, it is desirable to provide for different speeds; for instance, the agitation or washing operation should be provided at one speed for relative sturdy fabrics and at another for relatively delicate fabrics. Similarly, different spin speeds are desirable for different fabrics. My invention relates particularly to a means which is highly effective in a machine of this type for providing a selectivity of speeds from single-speed drive motor 12.

Referring now to FIGURES 2 and 3 in conjunction with FIGURE 1, and more particularly initially to FIGURE 3, a driven shaft 26 is provided which constitutes the main transmission shaft through which transmission 20 receives power. It is the direction of rotation of shaft 26 which determines, in conventional transmissions, whether agitation or spin is provided. Members 27 and 28 are rigidly secured on a reduced diameter portion 29 of shaft 26 adjacent the bottom thereof. Pulley 19 is mounted on the member 28 by means of a bearing 30 so that the pulley 19 rotates freely on shaft 26, but is not axially movable thereon. As opposed to this, pulley 17 is rotatably mounted on member 27 by means of a bearing 31 so that it not only may rotate on shaft 26, but may also move axially with respect thereto.

Pulley 17 has an annular portion 32 provided with a frictional surface 33 which, when it engages the top of pulley 19, provides a frictional driving engagement between the two pulleys so that they rotate together. When axial movement of pulley 17 on shaft 26 occurs so that pulley 17 moves away from pulley 19, the driving relation between the two pulleys ceases to exist. The two pulleys are normally biased into engagement with each other by a coil spring member 34 positioned about shaft 26; one end of the spring bears against pulley 17 and the other end is retained by a spring retainer member 35 secured to member 27.

Member 28 has a surface 36 thereof formed as a cam surface engageable by a cam follower member 37 rigidly secured to pulley 17, and, in the present case, formed integral therewith. It will readily be seen from FIGURE 3 that the engagement of follower member 37 against cam face 36 provides a driving relationship whereby pulley 17 causes rotation of shaft 26. In addition, it will be seen that when the follower member 37 rides up on the surface 36, against the action of spring 34, it causes axial movement of pulley 17 away from pulley 19.

Referring now more particularly to FIGURE 2, belt 18 is sufficiently tight around driving pulley 14 and driven pulley 19 so that whenever motor 12 causes rotation of pulley 14 the belt will in turn transmit this driving energy to pulley 19. Belt 16, however, is long enough so that it is normally relatively loose on driving pulley 13 and driven pulley 17. In fact, if no additional steps are taken, the mere rotation of pulley 13 will not cause any transmission of energy through belt 16 to pulley 17. However, an idler pulley member 38 is provided, rotatably secured on an arm 39 which is pivotally mounted on a pin 40 forming a part of the support means 41 for the driving system (see also FIGURE 1).

Also carried on this support means is a solenoid assembly 42 wherein a plunger member 43 is drawn in when the solenoid is energized. The plunger member controls the movement of a link 44 connected to arm 39 so that when the solenoid 42 is energized arm 39 is moved to the position shown in dotted outline. In that position, the idler pulley 38 is moved to its dotted outline position so as to bear against the outside of belt 16 and provide sufficient tightness in the belt to permit the transfer of rotational energy from pulley 13 to pulley 17.

The cooperative relationship of the foregoing components will now be briefly described to make clear the operation of the invention. When the speed provided by pulley 13 (preferably the higher of the two alternatively selectable speeds) is to be selected, solenoid 42 is energized to cause tightening of belt 16 and driving of pulley 17 by pulley 13. When pulley 17 is driven in this manner, directly by the belt 16, its rotation is transmitted through cam follower 37 and cam surface 36 to cause rotation of shaft 26 and cause operation of transmission 20 as described. In addition, the torque being transmitted causes the cam follower member 37 to rise on surface 36 before it achieves a position of stability, in view of the driving torque required to be delivered to shaft 26 and the action of spring 34. Since pulley 17 is raised by this action, the surface 33 is spaced from pulley 19, and the fact that pulley 19 is continuously being rotated at the same time but at a different speed by belt 18 has no effect on the operation of the machine. Consequently, the shaft 26 is rotated at the speed imparted to pulley 17 by pulley 13.

When a second lower speed is to be provided, solenoid 42 is de-energized. This de-energization of the solenoid loosens belt 16 so that pulley 17 is not driven by pulley 13. Instead, the rotation of pulley 19 is transmitted through the frictional driving surface 33 of pulley 17 which is in engagement with pulley 19. The consequent rotation of pulley 17 is then transmitted through the cam follower 37 and cam surface 36 to the shaft 26 as before. There will, of course, be a tendency for the cam follower 37 to cause pulley 17 to rise on surface 36. However, as soon as this happens the surface 33 is no longer in driven engagement with pulley 19; thus, the driving of pulley 17 by pulley 19 is effected at the particular speed determined by this relationship.

It will thus be seen that either of two speeds may be delivered to the agitator 9 and basket 2 of machine 1 shown in FIGURE 1 for a single output speed of motor 12, and that this may be effected by simple energization or de-energization of solenoid 42 as described. It will further be recognized that if, as is true of some machines presently on the market, a multi-speed clutch 15 or a two-speed motor 12 should be used, then my particular two speed arrangement permits the provision of a total of four speeds: for each of the speeds provided to pulleys 13 and 14, there will be two speeds which may be delivered to shaft 26.

It will be understood that, while in accordance with the patent statutes I have described what at present is considered to be the preferred embodiment of my invention, it will be obvious to those skilled in the art that various changes and modifications may be made therein without departing from my invention, and it is therefore aimed in the appended claims to cover all such changes and modifications as fall within the true spirit and scope of my invention.

What I claim as new and desire to secure by Letters Patent of the United States is:

1. Means for driving a driven member at two speeds from a single-speed driving source comprising:
 (a) first and second driving pulleys arranged to be driven together from said source;
 (b) first and second driven pulleys rotatably mounted on said driven member, said second driven pulley being also axially movable on said driven member, said driven pulleys having driving surfaces engageable with each other;
 (c) first and second closed belts respectively connecting said first driving pulley to said first driven pulley and said second driving pulley to said second driven pulley, said second belt being long enough to slip readily on said second driving and driven pulleys;
 (d) take-up means selectively operable between first and second positions, said take-up means in its first position leaving said second belt loose on said second driving and driven pulleys, said take-up means in its second position causing said second belt to be tightened and to transmit torque between said second driving and driven pulleys;
 (e) a cam follower;
 (f) a cam surface, one of said cam follower and cam surface being secured to said second driven pulley and the other being secured to said driven member, said surface and said follower engaging each other in rotatable driving relationship so that said driven means is rotated by said second driven pulley when said second driven pulley rotates;

(g) and biasing means biasing said second driven pulley toward said first driven pulley and biasing said cam surface and cam follower together;

(h) said first driven pulley driving said driven member through the engagement of said drive surfaces of said driven pulleys when said take-up means is in its first position, said second driven pulley driving said driven member and being moved axially out of said frictional engagement by said cam follower and said cam surface when said take-up means is in its second position.

2. The apparatus defined in claim 1 wherein said drive surfaces of said driven pulleys are formed as frictionally engageable drive surfaces.

3. The apparatus defined in claim 1 wherein said first driving and driven pulleys are designed to provide a lower speed to said driven member than said second driving and driven pulleys.

4. The apparatus defined in claim 1 wherein said biasing means is a helical compression spring surrounding said driven member.

5. Means for driving a driven member at two speeds from a single-speed driving source comprising:

(a) first and second driving pulleys arranged to be driven together from said source;

(b) first and second driven pulleys rotatably mounted on said driven member, said second driven pulley being also axially movable on said driven member, said driven pulleys having frictional drive surfaces engageable with each other;

(c) first and second closed belts respectively connecting said first driving pulley to said first driven pulley and said second driving pulley to said second driven pulley, said second belt being long enough to slip readily on said second driving and driven pulleys;

(d) take-up means selectively operable between first and second positions, said take-up means in its first position leaving said second belt loose on said second driving and driven pulleys, said take-up means in its second position causing said second belt to be tightened and to transmit torque between said second driving and driven pulleys;

(e) a cam follower secured to said second driven pulley;

(f) a cam surface secured to said driven member and engaged by said follower, said surface being formed so that it is rotatably driven by said followers when said second pulley rotates;

(g) and spring means biasing said second driven pulley toward said first driven pulley and biasing said cam surface and cam follower together;

(h) said first driven pulley driving said driven member through frictional engagement of said driven pulleys when said take-up means is in its first position, said second driven pulley driving said driven member and being moved axially out of said frictional engagement by said cam follower and said cam surface when said take-up means is in its second position.

No references cited.

DON A. WAITE, *Primary Examiner.*